United States Patent Office.

ERNST BERTRAND, OF KLADNO, BOHEMIA, AUSTRIA-HUNGARY, ASSIGNOR TO THE POTTSTOWN IRON COMPANY, OF POTTSTOWN, PENNSYLVANIA.

PROCESS OF MANUFACTURING BASIC LININGS FOR CONVERTERS.

SPECIFICATION forming part of Letters Patent No. 419,404, dated January 14, 1890.

Application filed July 19, 1888. Serial No. 280,439. (No specimens.)

*To all whom it may concern:*

Be it known that I, ERNST BERTRAND, a citizen of the United States, at present residing at Kladno, Bohemia, Austria-Hungary, have invented a Process of Manufacturing Basic Linings for Converters, of which the following is a specification.

The object of my invention is to provide a lining for the walls and bottoms of basic converters and furnaces which shall be uniform in composition, uniformly burned, and of a homogeneous character throughout.

There are two methods of lining basic-converters in ordinary practice, one being to build up the lining of burned bricks made of dolomite or limestone, which are laid in a mortar of burned brick and tar, while the other method of lining is to burn the dolomite or limestone in a cupola or kiln, then grind it up, mix it with tar, and build up the lining with this composition by the ramming process. The first method carries with it the objection that the joints between the bricks are a source of weakness, while in the second method the dolomite is apt to be irregularly burned in the cupola or kiln. It is also apt to be mixed with more or less ashes and cinder, which have to be picked out as far as possible, and there is always more or less loss of the amount of fine stuff, which cannot be picked clean from the cinder and must be thrown away. I meet these objections and produce a lining consisting of a homogeneous mass, uniformly burned, and regular in composition by the following method of making linings:

I first take the limestone or dolomite and grind it up thoroughly and form bricks therefrom by mixing the ground-up stone with water and with or without an adhesive substance, such as molasses. The bricks thus formed are baked or burned at a white heat in a kiln for, say, forty-eight hours. These burned bricks I then grind up again thoroughly and mix the ground-up burned bricks with tar—say from ten to twelve per cent. of tar in proportion to the ground-up brick. The composition thus produced is then rammed up in the converter or furnace to form the lining.

The advantages of the preparatory grinding up of the stone into a brick and baking the brick and then grinding this burned brick again is that I thereby produce a very homogeneous mass, evenly burned, and very regular in composition. This homogeneousness and regularity in composition can never be obtained in the cupola or kiln burned dolomite. A further advantage is economy of materials, because in kiln or cupola burned stone there is always a loss from the mass of fine stuff, which has to be thrown away because it cannot be freed from cinder.

I claim as my invention—

The mode herein described of preparing linings for basic converters and furnaces, said mode consisting in first grinding up the stone, making bricks of it, and burning them, then grinding up the burned bricks and mixing this ground-up material with tar, substantially as set forth.

In testimony whereof I have signed my name to this specification in the presence of two subscribing witnesses.

ERNST BERTRAND.

Witnesses:
    JUSTEN MUCHAY,
    ADOLF FISCHER.